P. B. WOHLRAB.
ROTATABLE HOE OR CUTTER.
APPLICATION FILED JAN. 20, 1914.
1,114,839.
Patented Oct. 27, 1914.
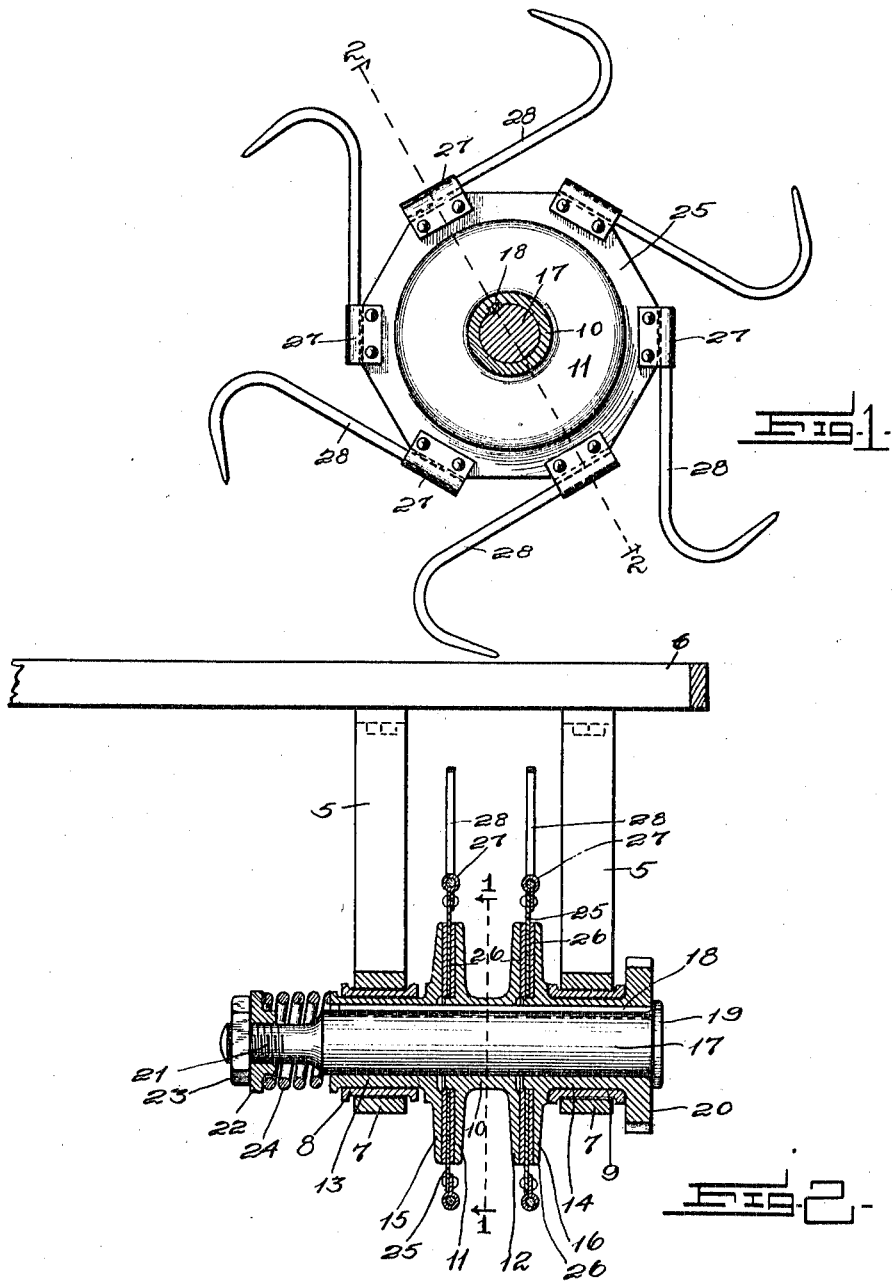
Witnesses
Inventor
Paul B. Wohlrab,
By
C. L. Parker
Attorneys

UNITED STATES PATENT OFFICE.

PAUL B. WOHLRAB, OF RACINE, WISCONSIN.

ROTATABLE HOE OR CUTTER.

1,114,839.   Specification of Letters Patent.   Patented Oct. 27, 1914.

Application filed January 20, 1914. Serial No. 813,168.

*To all whom it may concern:*

Be it known that I, PAUL B. WOHLRAB, a citizen of the United States, residing at Racine, in the county of Racine and State of Wisconsin, have invented certain new and useful Improvements in Rotatable Hoes or Cutters, of which the following is a specification.

My invention relates to improvements in rotatable cutters or hoes, embodied in farming implements, and has particular reference to apparatus of this character so constructed that the blade or blades thereof are continuously rotated under normal conditions, but are adapted to stop when encountering an obstruction in the soil, such as a stone or the like, thus preventing injury to the blade or blades or other parts of the apparatus.

An important object of the invention is to provide means of the above mentioned character, which are simple in construction, inexpensive to manufacture, strong, durable, and convenient in use.

A further object of the invention is to provide means of the above mentioned character, whereby the tension applied to the blade carrying elements may be quickly and easily adjusted by the operation of a single clamping nut or element.

A further object of the invention is to provide apparatus of the above mentioned character, formed of few and simple parts, which may be quickly and easily assembled or separated.

Other objects and advantages of the invention will be apparent during the course of the following description.

In the accompanying drawings forming a part of this specification and in which like numerals are employed to designate like parts throughout the same, Figure 1 is a transverse sectional view taken on line 1—1 of Fig. 2, and, Fig. 2 is a longitudinal sectional view taken on line 2—2 of Fig. 1.

In the drawings, wherein for the purpose of illustration, is shown a preferred embodiment of my invention, the numeral 5 designates depending arms or brackets, supported by a frame 6 of a wheeled implement, as shown. At their lower ends these brackets or arms are provided with two-part heads 7, for receiving two-part horizontally arranged tubular bearings 8 and 9.

The numeral 10 designates an intermediate sleeve, provided near its opposite ends with outwardly extending annular flanges or disks 11 and 12.

The numerals 13 and 14 designate sleeves which are freely rotatably mounted within the tubular bearings 8 and 9 respectively. The sleeve 13 is provided at its inner end with an outwardly extending annular flange or disk 15 disposed near the flange 11 while the sleeve 14 is provided at its inner end with an outwardly extending annular flange or disk 16, disposed near the flange 12, as shown.

The sleeves 10, 13 and 14 are splined upon a horizontally arranged stub-shaft 17, as shown at 18, whereby the sleeves are free to move longitudinally thereof and connot rotate thereon. The stub-shaft 17 is provided at one end with an enlarged head 19, engaging a driving element, preferably in the form of a sprocket or gear wheel 20, preferably formed integral with the sleeve 14, as shown. The opposite end of the stub-shaft 17 is provided with a screw-threaded reduced portion 21, receiving thereon an adjusting nut 22, which may be locked in the desired position by means of a clamping nut 23. Arranged between the adjusting nut 22 and the outer end of the sleeve 13 is a suitably stiff compressible and expansible coil spring 24. As clearly shown in Fig. 2, the sleeve 13 is substantially longer than the tubular bearing 8, whereby the sleeve may be shifted longitudinally in either direction with relation to the tubular bearing 8, while the sleeve 14 is of substantially the same length as the tubular bearing 9, whereby such tubular bearing holds the sleeve 14 against perceptible longitudinal movement in either direction.

Arranged between the flanges or disks 11, 15 and 12, 16 are blade or cutter carrying disks 25, upon the opposite sides of which are preferably arranged friction disks 26, engaging with the annular flanges carried by the sleeves. While I prefer to employ these friction disks, yet it is to be understood that the same may be dispensed with, and the apparatus so constructed that the flanges of the sleeves will directly frictionally engage the cutter or blade carrying disks 25.

The cutter or blade carrying disks are preferably of the construction more clearly shown in Fig. 1, the same having sockets 27 rigidly attached thereto, carrying outwardly extending cutters or blades 28, of any well known or preferred type.

The operation of the apparatus is as follows: The adjusting nut 22 is manipulated whereby the spring 24 is placed under the desired tension to effect the proper clamping engagement between the annular flanges, disks 26, and cutter or blade carrying disks 25. The rotation of the gear or sprocket wheel 20 is transmitted to the stub-shaft 17, and through the same to the annular flanges 11, 15 and 12, 16. The rotation of these annular flanges, through the medium of the frictional disks 26, is transmitted to the cutter or blade carrying disks 25, which are normally rigidly clamped or locked thereto, for rotation therewith. When either of the cutters or blades 28 encounters an obstacle in the soil, such as a stone or the like, the disk 25 carrying the same is stopped, while the rotation of the stub-shaft 17 continues, which is possible by the provision of the friction clutch means.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having described my invention, I claim:—

1. In apparatus of the character described, a relatively stationary bearing, a sleeve rotatably mounted therein and held thereby against perceptible longitudinal movement, an outwardly extending flange carried by the inner end of the sleeve, driving means for the sleeve carried by the outer end thereof, a stub-shaft extending through the sleeve and having an enlarged head engaging the driving means and provided at its opposite end with a screw-threaded portion, a second sleeve mounted upon the stub-shaft and provided with an outwardly extending flange arranged in coöperative relation with the first named flange, means to spline said sleeves upon the stub-shaft a spring mounted upon the stub-shaft to urge the sleeves toward each other, an adjusting nut engaging the spring and arranged upon the screw-threaded portion of the stub-shaft, and a blade carrying element arranged between the flanges of the sleeves.

2. In apparatus of the character described, a bearing, a sleeve rotatably mounted within the bearing and provided near one end with a friction disk, a rotatable element connected with the opposite end of the sleeve to drive the same, a stub-shaft passing through the sleeve and provided with means to prevent its longitudinal movement in one direction with relation to the sleeve, a co-acting friction disk arranged upon the stub-shaft near the first named friction disk, a spring to urge the second named friction disk toward the first named friction disk, and a blade-carrying disk arranged between the co-acting friction disks, rotatably mounted upon the stub-shaft and driven by the friction disks.

3. In apparatus of the character described, a bearing, a sleeve rotatably mounted within the bearing and held thereby against perceptible longitudinal movement and provided near one end with a frictional disk, a stub-shaft passing through the sleeve and provided with an enlarged head to engage with one end of the sleeve, a second sleeve mounted upon the stub-shaft and provided with a friction disk to coöperate with the first named friction disk, means to spline the sleeves to the stub-shaft, a coil spring surrounding the stub-shaft and serving to urge one friction disk toward the other, and a blade-carrying disk rotatably mounted upon the stub-shaft and arranged between the friction disks to be driven thereby.

In testimony whereof I affix my signature in presence of two witnesses.

PAUL B. WOHLRAB.

Witnesses:
PETER PRUDENT, Jr.,
L. SCHLEGEL.